United States Patent [19]

Fukushima et al.

[11] Patent Number: 4,779,835

[45] Date of Patent: Oct. 25, 1988

[54] MOLD FOR TRANSFER MOLDING

[75] Inventors: Yuichi Fukushima, Saitama; Fujio Kobayashi, Kanagawa; Shinichiro Takahashi, Tokyo, all of Japan

[73] Assignee: Sony Corporation, Tokyo, Japan

[21] Appl. No.: 903,562

[22] Filed: Sep. 4, 1986

[30] Foreign Application Priority Data

Sep. 5, 1985 [JP] Japan ................. 60-196646

[51] Int. Cl.$^4$ .................. B29C 45/04; B29C 45/03
[52] U.S. Cl. ................. 249/161; 425/116; 425/195; 425/408; 425/450; 425/588; 425/589
[58] Field of Search ........... 425/190, 195, 589, 406, 425/412, 450.1, 451, 451.9, 423, 441, 399, 589, 116, 117, 588, 290, 195, 408; 249/161; 264/297.1

[56] References Cited

U.S. PATENT DOCUMENTS

| 133,229 | 11/1872 | Hyatt et al. | 264/211 |
|---|---|---|---|
| 1,750,424 | 3/1930 | Olson | 425/423 |
| 2,342,772 | 2/1944 | Wellman | 425/423 |
| 2,612,666 | 10/1952 | McGarigal | 425/589 |
| 2,708,288 | 5/1955 | Fuller et al. | 425/195 |
| 2,871,513 | 2/1959 | Homeier | 425/450.1 |
| 3,431,601 | 3/1961 | Lipscomb | 425/195 |
| 3,746,488 | 7/1973 | Messenger | 425/195 |
| 3,972,668 | 8/1976 | Cessna | 425/450.1 |
| 4,372,740 | 2/1983 | Kuramochi et al. | 425/588 |
| 4,416,604 | 11/1983 | Bender et al. | 425/190 |
| 4,504,208 | 3/1985 | Kurumaji et al. | 425/589 |
| 4,575,328 | 3/1986 | Fierkens et al. | 425/190 |
| 4,586,886 | 5/1986 | Prischak et al. | 425/190 |

Primary Examiner—Willard E. Hoag
Attorney, Agent, or Firm—Hill, Van Santen, Steadman & Simpson

[57] ABSTRACT

A mold for transfer molding having a cavity block in which a mold injected with resin is formed and a templet for holding the cavity block, in which a liquid layer is provided between the templet and a support member for supporting the templet, whereby the templet can be moved up and down on the liquid layer at its respective portions.

2 Claims, 5 Drawing Sheets

MOLD FOR TRANSFER MOLDING

BACKGROUND OF THE INVENTION

1. Field of the Invention

This invention relates generally to a mold for transfer molding and more particularly to a mold for transfer molding suitable for packaging, for example, a semiconductor integrated circuit chip by a transfer mold.

2. Description of the Prior Art

As a mold for transfer molding which is used for packaging a semiconductor integrated circuit chip by a transfer mold, there is proposed in the prior art such one as shown in FIG. 1.

In FIG. 1, reference numeral 1 designates a cavity block in which a mold 2 injected with a resin and a gate 3 through which the resin is fed to the mold 2 are formed. Also referring to FIG. 2, a runner 4 which serves as a path through which the resin is flowed is formed on a runner block 5. This runner block 5 is held between a pair of cavity blocks 1, 1 and then they are fixed to a cavity chase 7 which is fixed to a templet 6. A runner block 10 is held by a pair of cavity blocks 9, 9 in each of which a mold 8 injected with the resin is formed and then they are fixed to a cavity chase 12 which is fixed to a templet 11. Then, the cavity block 1 and the cavity block 9 are superposed such that a cavity 13 in which a semiconductor integrated circuit chip is packaged by the resin is formed by the mold 2 formed in the cavity block 1 and the mold 8 formed in the cavity block 9 into which cavity 13 injected is the resin. Further, heaters 14, 15 and temperature detecting elements 16, 17 are respectively provided in the templets 6 and 11, thus a mold for tranfer molding being formed.

By the thus constructed mold for transfer molding, when the semiconductor integrated circuit chip is packaged by, for example, epoxy resin, the mold for transfer molding is at first disposed on a molding press machine 20 through stud members 19 as shown in FIG. 3. Next, as shown in FIG. 4, a semiconductor integrated circuit chip 21 is disposed on a lead frame 22 and an electrode of the semiconductor integrated circuit chip 21 and a lead portion of the lead frame 22 are connected by an Au wire 23. Thereafter, this lead frame 22 is disposed on the cavity block 1 in such a manner that the portion of the lead frame 22 on which the semiconductor integrated circuit chip 21 is disposed is placed at substantially the center portion of the cavity 13. Then, this lead frame 22 is sandwiched with pressure by the cavity blocks 1 and 9. Subsequently, a predetermined current is supplied to the heaters 14 and 15 provided in the templets 6 and 11 to thereby heat the cavity blocks 1 and 9 up to 170° C. Then, an epoxy resin which is preheated to 80° C. is injected with pressure through the runner 4 and the gate 3 to the cavity 13 and then cured, whereby to obtain a semiconductor integrated circuit chip 22a which is sealed on the lead frame 22 by the epoxy resin as shown in FIG. 5.

In the prior art mold for transfer molding, however, due to the fact that the templets are not equal in thickness and the mold is thermally distorted by heating the same to a temperature ranging from 160° C. to 180° C., as shown in FIG. 6, the contact surfaces between the cavity blocks 1 and 9 are not satisfactory and hence clearances 23a, 23b, 23c, . . . are formed on the contact surfaces. Then, the resins injected into the cavity 13 is escaped out through these clearances 23a, 23b, 23c, . . . to thereby produce extra resin portions or flashes.

There is then a disadvantage that the extra resin portions or flashes must be removed in the later process.

Therefore, as shown in FIG. 7, it is proposed that the cavity block 1 is supported by a strong spring 24 such as a counter-sunk spring and the like so as to remove the influences caused by the uneven thickness of the templets, the heat distortion thereof and so on. In this case, the resin is flowed into the clearances among the cavity chase 7, the runner block 5 and the cavity block 1 and hence cavity block 1 is not moved, producing flashes much more.

For this reason, it has been proposed that as shown in FIG. 8, a thin plate or shim 25 is inserted between the templet 6 and the stud member 19 which corresponds to the place where the flash is produced to thereby satisfactorily contact the cavity blocks 1 and 9 with each other without producing the spacings 23a, 23b, 23c, . . . on the contact surfaces therebetween, thus suppressing the flashes from being produced.

However, the adjustment by the shim 25 takes much time and the re-adjustment thereof is required each time the mold is exchanged and the molding press machine 20 is replaced. Thus, there are disadvantages that the molding takes much time and that the molding pres machine 20 can not be operated effectively.

OBJECTS AND SUMMARY OF THE INVENTION

Accordingly, it is an object of this invention to provide an improved mold for transfer molding which can overcome the shortcomin9s encountered with the prior art mold.

Another object of this invention is to provide a mold for transfer molding which does not need the adjustment done by a thin plate as in the prior art.

Still another object of this invention is to provide a mold for transfer molding which can suppress a flash from being produced.

Further object of this invention is to provide a mold for transfer molding which can considerably reduce the treatment works for removing the flash.

Still further object of this invention is to provide a mold for transfer molding which can reduce the time necessary for molding very much.

Yet further object of this invention is to provide a mold for transfer molding which enables a molding press machine to be operated effectively.

According to one aspect of this invention, there is provided a mold for transfer molding having cavity blocks in which molds injected with a resin are formed and templets for holding the cavity blocks, in which a liquid layer is provided between the templet and a support member for supporting the templet, whereby the templet can be moved up and down on the liquid layer at respective portions.

According to the present invention, since the liquid layer is provided between the templet and the support member therefor, even if a clearance is produced on the contact surfaces between the opposing cavity blocks by the different thickness of the templets, the stress generated in the liquid layer upon squeezing the mold acts uniformly on the surface of the templet. Thus, the respective portions of the templet can be moved up and down in response to the contact strength of the contact surfaces. Thus, the contact degrees of all portions of the contact surfaces between the cavity blocks can be made uniform without producing the clearance on the contact surfaces.

Also, upon heating, even if there is caused a thermal distortion in the templet and the contact degrees between the cavity blocks are scattered, the stress of the liquid layer acts uniformly on the surface of the templet so that the respective portions of the templet are moved up and down in response to the strength of the contact degrees of the contact surfaces, whereby the contact degrees of all portions of the contact surfaces between the cavity blocks become uniform, preventing the clearance from being produced thereon.

These and other objects, features and advantages of the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Figure 1:
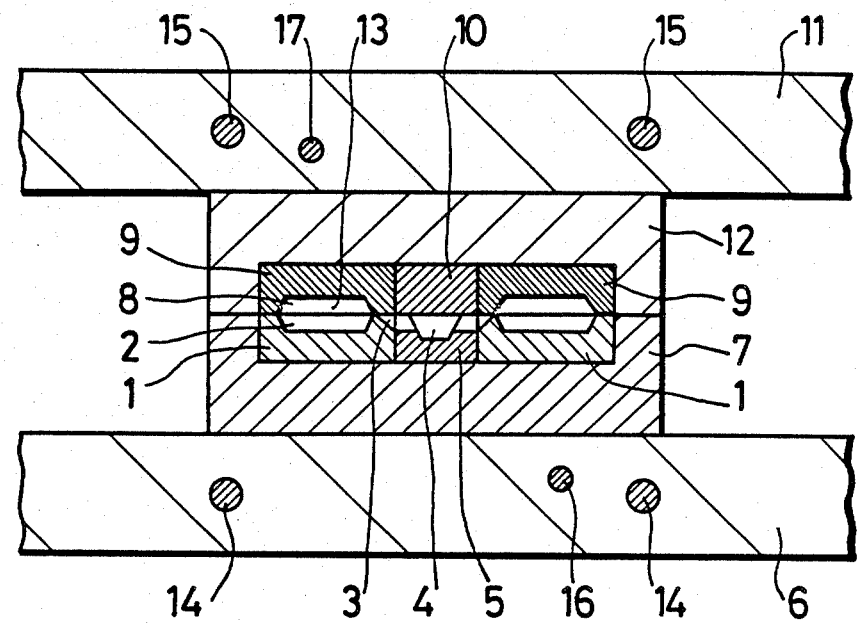
FIG. 1 is a cross-sectional view illustrating a main portion of an example of a prior art mold for transfer molding.
Figure 2:
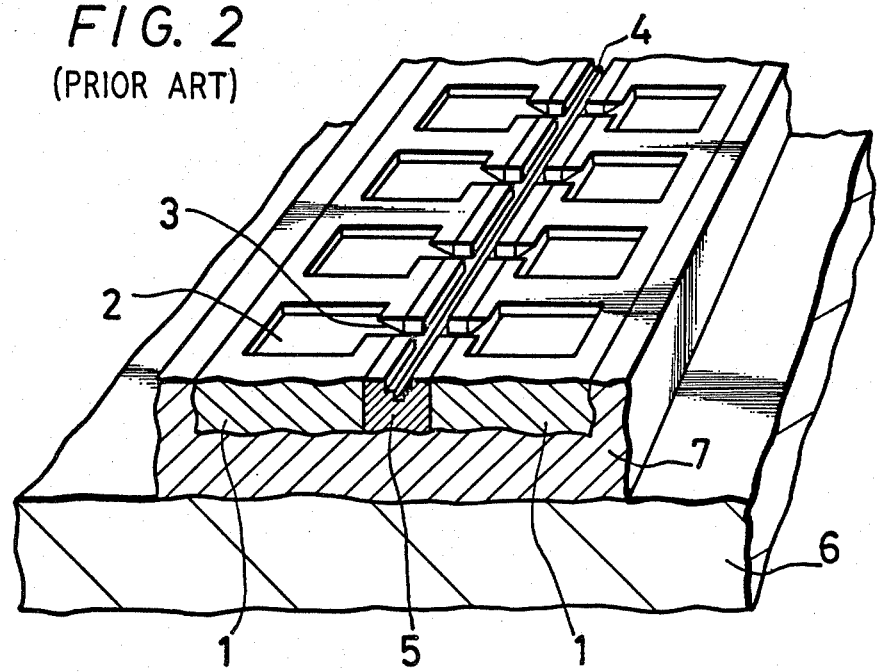
FIG. 2 is a perspective view used to explain an example of the prior art mold for transfermolding.
Figure 9:
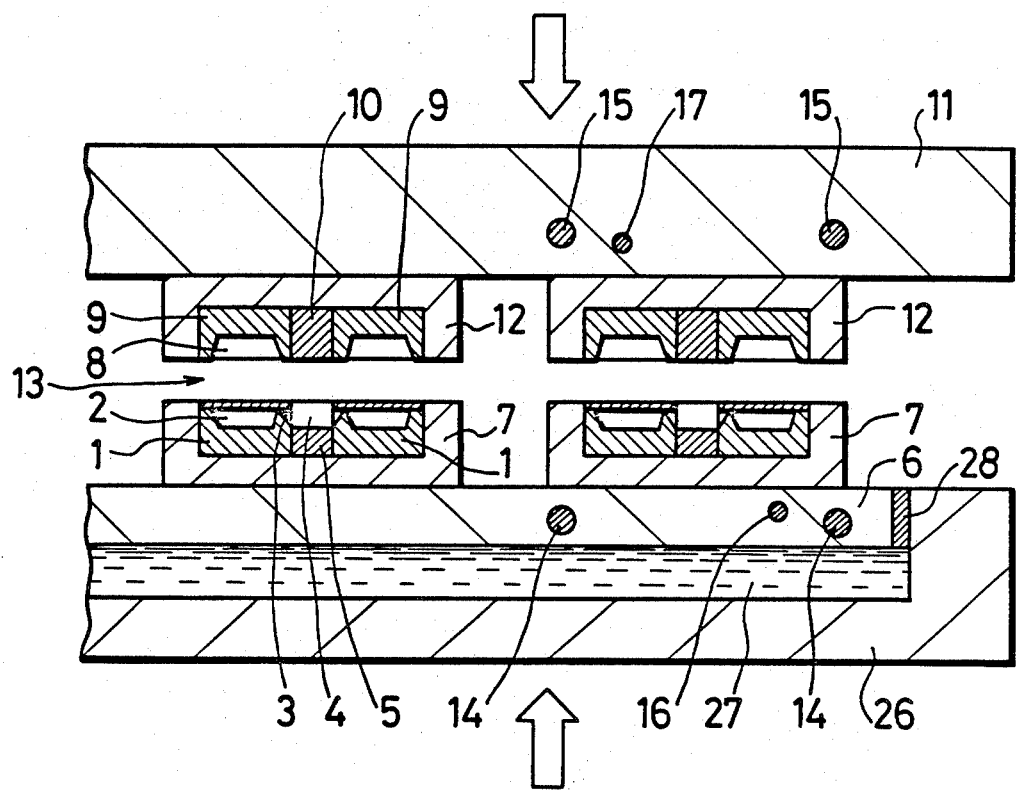
FIG. 9 is a cross-sectional view illustratin9 a main portion of an embodiment of a mold for transfer molding according to the present invention.

Now, an embodiment of a mold for transfer molding according to this invention will hereinafter be described in detail with reference to FIG. 9. In FIG. 9, like parts corresponding to those of FIG. 1 are marked with the same references and will not be described in detail.

Referring to FIG. 9, the templet 6 is disposed through a liquid or oil layer 27 on a support member 26 and an oil seal 28 is disposed between the periphery of the templet 6 and the support member 26 in such a manner that the respective portions of the templet 6 can be moved up and down on the oil layer 27. The other construction is similar to that of the prior art example. That is, referring to FIG. 9, the runner block 5 on which formed is the runner 4 or the path through which the resin is flowed is sandwiched by the pair of cavity blocks 1, 1 each of which has the mold 2 injected with the resin and the gate 3, and then they are fixed to the cavity chase 7 attached to the templet 6. Also, the runner block 10 is sandwiched by the pair of cavity blocks 9, 9 on each of which the mold 8 injected with the resin is formed and then they are fixed to the cavity chase 12 that is attached to the templet 11. Then, the cavity block 1 and the cavity block 9 are superposed each other such that the cavity 13 for sealing the semiconductor integrated circuit chip by resin is formed by the mold 2 formed on the cavity block 1 and injected with the resin and the mold 8 formed on the cavity block 9 and injected with the resin. Further, the heaters 14, 15 and the temperature detecting elements 16, 17 are provided respectively in the templets 6 and 11, thus a mold for transfer molding being constructed.

Figure 3:
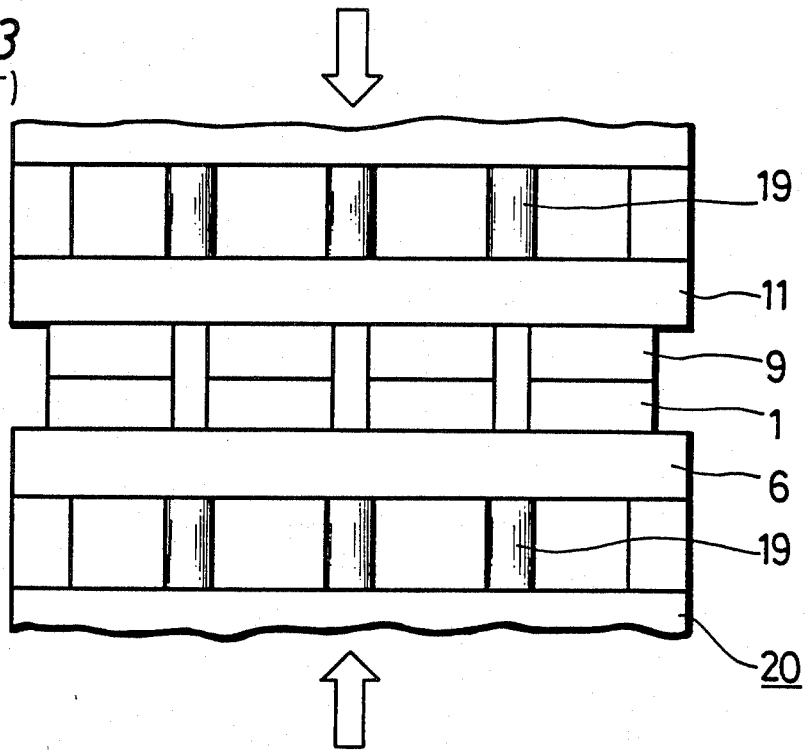
FIGS. 3, 4, 5, 6, 7 and 8 are diagrams respectively used to explain examples of a prior art mold for transfer molding.
Figure 4:
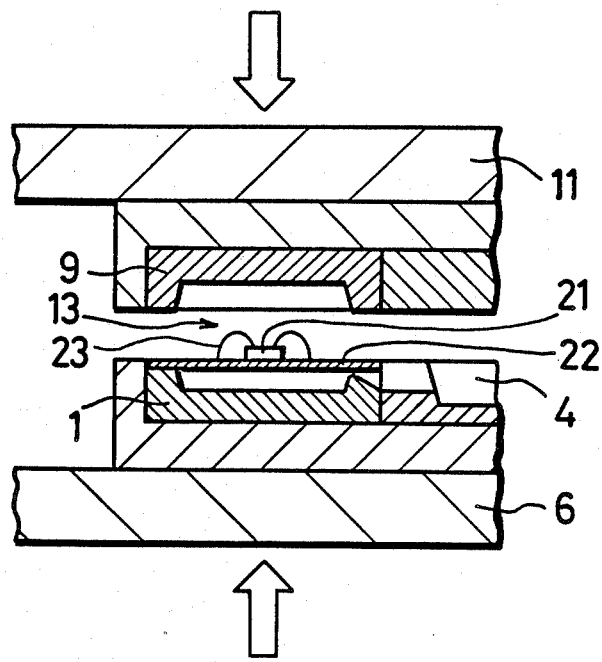
Figure 5:
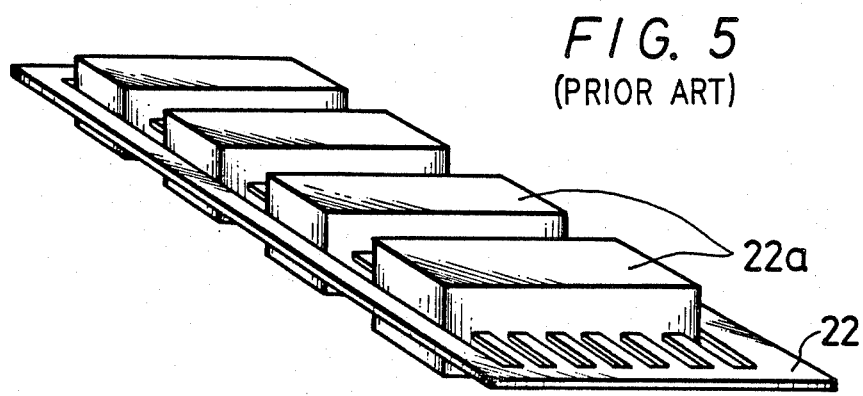
Figure 6:
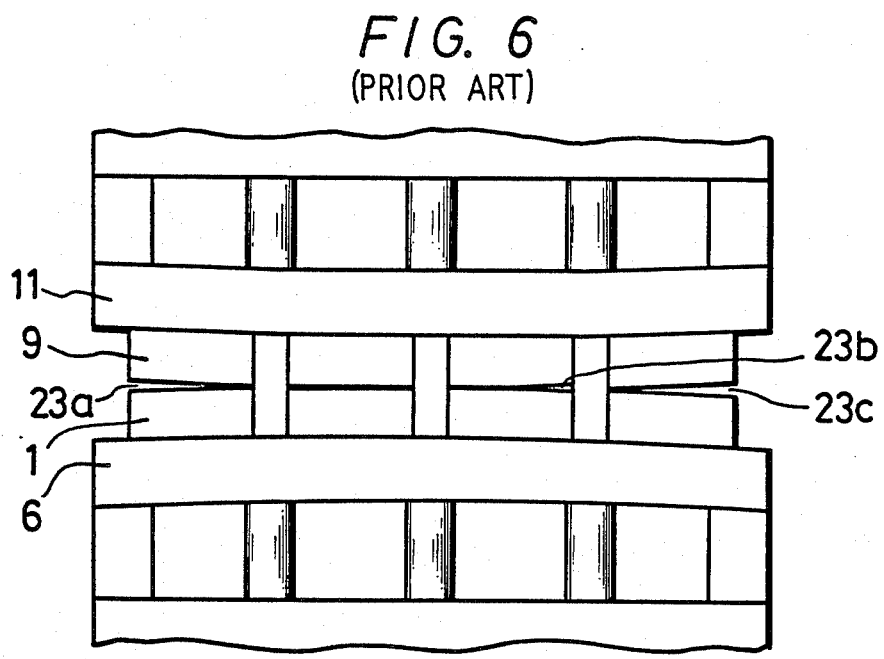
Figure 7:
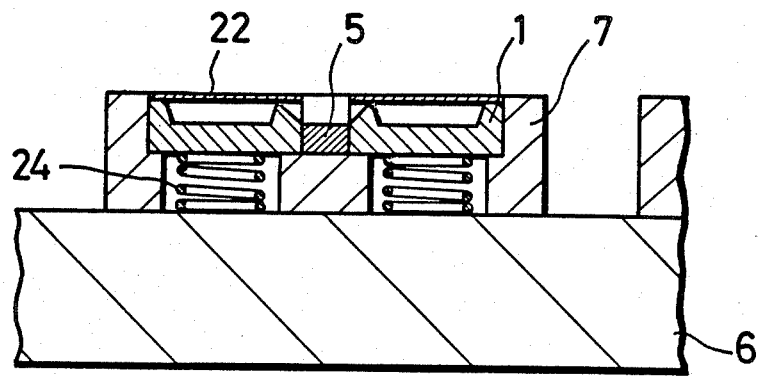
Figure 8:
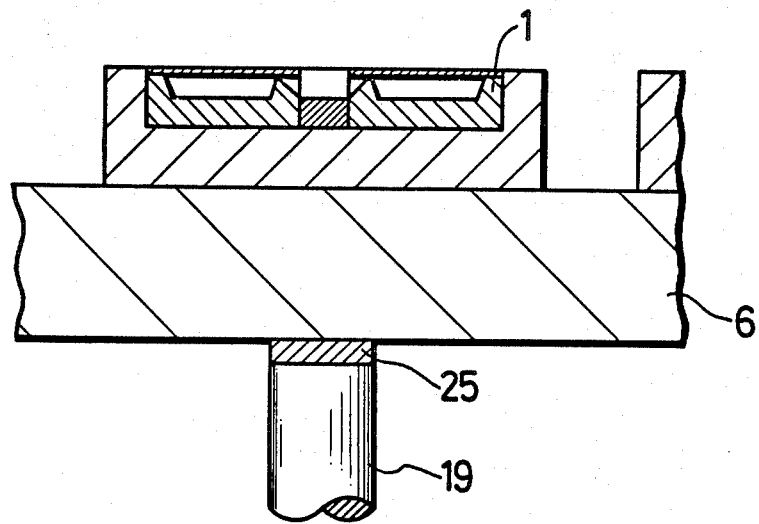

By the thus constructed mold for transfer molding, when the semiconductor integrated circuit chip is sealed by, for example, epoxy resin, similarly to the case of the prior art example, the mold for transfer molding is disposed on the molding press machine 20 through the stud members 19 as shown in FIG. 3. Then, as shown nn FIG. 4, the semiconductor integrated circuit chip 21 is disposed on the lead frame 22 and the electrode of the semiconductor integrated circuit chip 21 and the lead portion provided on the lead frame 22 are connected with each other by the Au wire 23. Thereafter, this lead frame 22 is disposed on the cavity block 1 such that its portion on which the semiconductor integrated circuit chip 21 is placed may be disposed at substantially the center portion of the cavity 13. Then, the lead frame 22 is gripped between the cavity blocks 1 and 9 with pressure. Subsequently, a predetermined current is supplied to the heaters 14 and 15 of the templets 6 and 11 to thereby heat both the cavity blocks 1 and 9 up to 170° C. Thereafter, the epoxy resin which is pre-heated to 80° C. is injected through the runner 4 and the gate 3 to the cavity 13 with pressure and then cured to thereby obtain the semiconductor integrated circuit chip 22a which is sealed by the epoxy resin, on the lead frame 22 as shown in FIG. 5.

In this case, according to this embodiment, since the oil layer 27 is provided between the templet 6 and the support plate 26, even if there is produced a clearance on the contact surface between the cavity blocks 1 and 9 by the different thicknesses of the templets 6 and 11, the stress generated in the oil layer 27 upon squeezing the molds uniformly acts on the surface of the templet 6. Therefore, the respective portions of the templet 6 are moved up or down in response to the strength of the contact surfaces between the cavity blocks 1 and 9. As a result, the contact degrees of all portions of the contact surfaces between the cavity blocks 1 and 9 become uniform so that any clearances are not formed.

Further, even when upon heating, different strengths are caused on the contact surfaces of the cavity blocks 1 and 9 by the heat distortion of the templets, the stress of the oil layer 27 uniformly acts on the surface of the templet 6 so that the respective portions of the templet 6 are moved up or down in response to the different contact strengths of the contact surfaces between the cavity blocks 1 and 9 and thus, the contact degrees of all the portions of the above mentioned contact surfaces become uniform thus the clearance being prevented from being produced.

Consequently, according to the present invention, the cavity blocks 1 and 9 can be contacted with each other without producing any clearance and the flash can be suppressed from being produced so that the treatment work for removing the above mentioned flash can be reduced. Further, since the adjustment done by the thin plate 25 as required in the prior art can be omitted and hence, when the mold is exchanged or the molding press machine 20 is replaced, the re-adjustment such as when the thin plate or shim 25 is used is not required, the treatment time necessary for molding can be reduced and that the molding press machine 20 can be operated effectively.

Figure 10:
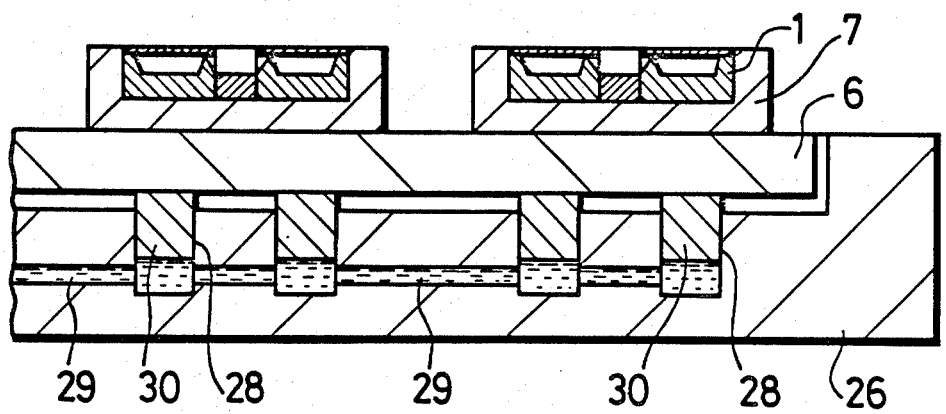
FIG. 10 is a cross-sectional view of a main portion of another embodiment of the mold for transfer molding according to the present invention.

In the above mentioned embodiment of this invention, there is provided the oil layer 27 whose area is substantially similar to that of the templet 6 and the templet 6 is located on this oil layer 27. Instead of the oil layer 27, such a version as shown in FIG. 10 is possible. Referring to FIG. 10, a plurality of cylinders 28a, 28a, ... are provided in the support member 26, these cylinders 28a, 28a, ... are communicated through oil circuits or pipes 29, 29 ... and the templet 6 is disposed on pistons 30, 30, ... of the cylinders 28a, 28a, ... By the arrangement shown in FIG. 10, it is possible to achieve the similar action and effects as those of the embodiment shown in FIG. 9.

While in the above mentioned embodiment the oil is used as the liquid for forming the liquid layer 27, it is needless to say that various kinds of liquids can be used as the liquid of the liquid layer 27.

Further, in the above embodiment of the present invention, only one templet 6 is supported by the support member 26 through the oil layer 27 or pistons 30 of the cylinders 28. It may be possible that the other templet 11 is alo supported similar to the templet 6, if necessary According to the present invention as set forth above, since the liquid layer is provided between the templet and the support member for supporting this templet, the cavity blocks can be satisfactorily contacted with each other without producing any clearance therebetween. Thus, the flash can be suppressed from being produced and the cost necessary for treating the afore-mentioned flash can be reduced. Also, the adjustment using the thin plate as in the prior art becomes unnecessary so that when the mold is exchanged or the molding press machine is replaced, the re-adjustment such as when the thin plate is used is not required so that the time necessary for the molding treatment can be reduced and that the molding press machine can be operated effectively.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A mold for transfer molding having a cavity block in which a mold injected with a resin is formed comprising:
   (a) a templet mounted to the mold for holding the cavity block;
   (b) a support member having a plurality of cylinders therein for supporting the templet, the cylinders being disposed on the templet; and
   (c) means for providing an actuating fluid to the cylinders.

2. The device of claim 1, wherein said support member is driven by a liquid actuable piston means.

* * * * *